United States Patent [19]

Langner

[11] Patent Number: 4,553,879

[45] Date of Patent: Nov. 19, 1985

[54] PIPELAYING IN ARTIC OFFSHORE WATERS

[75] Inventor: Carl G. Langner, Spring, Tex.

[73] Assignee: Shell Oil Company, Houston, Tex.

[21] Appl. No.: 603,279

[22] Filed: Apr. 24, 1984

[51] Int. Cl.⁴ .................. E02D 21/00; F16L 1/04; F16L 57/00

[52] U.S. Cl. .................. 405/270; 405/157; 405/217

[58] Field of Search .......... 405/61, 136–138, 405/143, 154, 156, 157, 158, 159, 169, 170, 172, 184, 203, 205, 211, 217; 175/53, 61, 62

[56] References Cited

U.S. PATENT DOCUMENTS

| | | | |
|---|---|---|---|
| 1,647,448 | 11/1927 | Jones | 405/159 X |
| 2,706,616 | 4/1955 | Osmun | 255/27 |
| 2,847,655 | 8/1958 | Schurman | 340/18 |
| 3,232,637 | 2/1966 | Pennington et al. | 405/172 X |
| 3,635,036 | 1/1972 | Hooper | 405/159 X |
| 3,817,345 | 6/1974 | Bailey | 181/0.5 NP |
| 4,041,720 | 8/1977 | Lebourg | 405/170 |
| 4,117,895 | 10/1978 | Ward et al. | 175/53 |
| 4,126,013 | 11/1978 | McGovern | 405/169 |
| 4,221,503 | 9/1980 | Cherrington | 405/184 |
| 4,245,313 | 1/1981 | Coates | 364/422 |
| 4,319,240 | 3/1982 | Stone et al. | 340/856 |
| 4,397,586 | 8/1983 | Weiss | 405/61 X |
| 4,478,537 | 10/1984 | Birdy et al. | 405/203 X |

FOREIGN PATENT DOCUMENTS

| | | | |
|---|---|---|---|
| 1064272 | 10/1979 | Canada | 405/157 |
| 589 | of 1870 | United Kingdom | 405/136 |
| 669006 | 6/1979 | U.S.S.R. | 405/157 |
| 769173 | 10/1980 | U.S.S.R. | 405/172 |

OTHER PUBLICATIONS

OFFSHORE Magazine, pp. 17 and 22, Dec. 1983, Pictorial Views of Self-Contained Mobil Drilling Platform, Concrete Island Drilling System.

Primary Examiner—Dennis L. Taylor
Assistant Examiner—Nancy J. Stodola

[57] ABSTRACT

The present invention provides a method and apparatus for constructing pipelines in Arctic offshore waters by a directional drilling technique, thereby minimizing exposure to ice gouging and eliminating the hazards associated with unstable permafrost. A special drilling-pipeline construction vessel is also provided which has a conical shape with reinforced outer walls to resist ice forces, which vessel includes means to install deep underground pipeline segments and means to connect and protect the pipe ends.

8 Claims, 4 Drawing Figures

U.S. Patent    Nov. 19, 1985    4,553,879
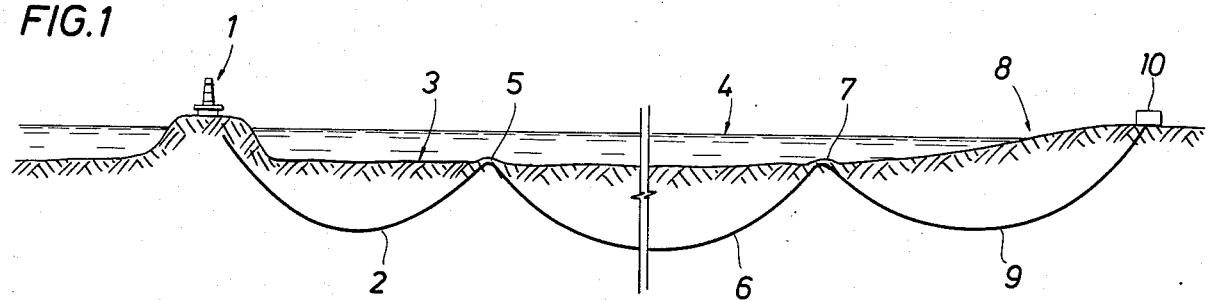
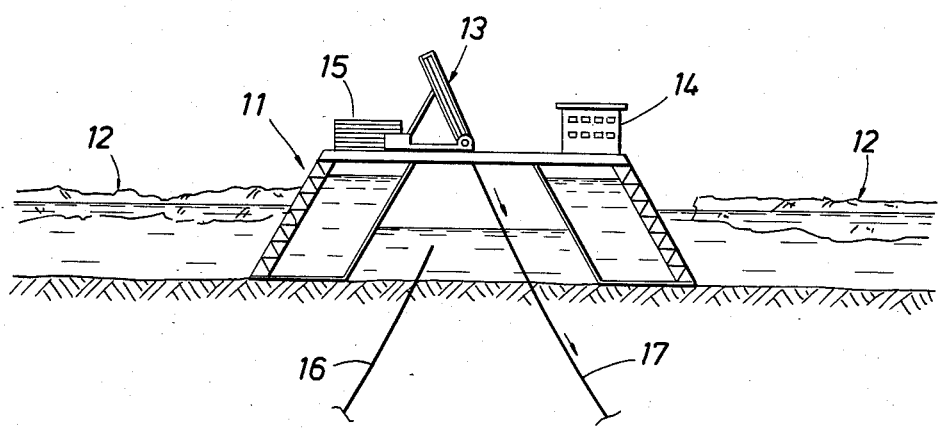
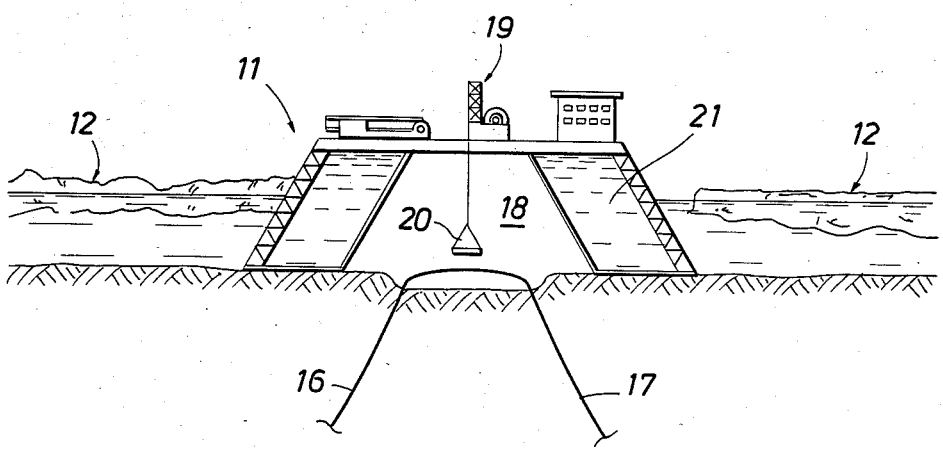
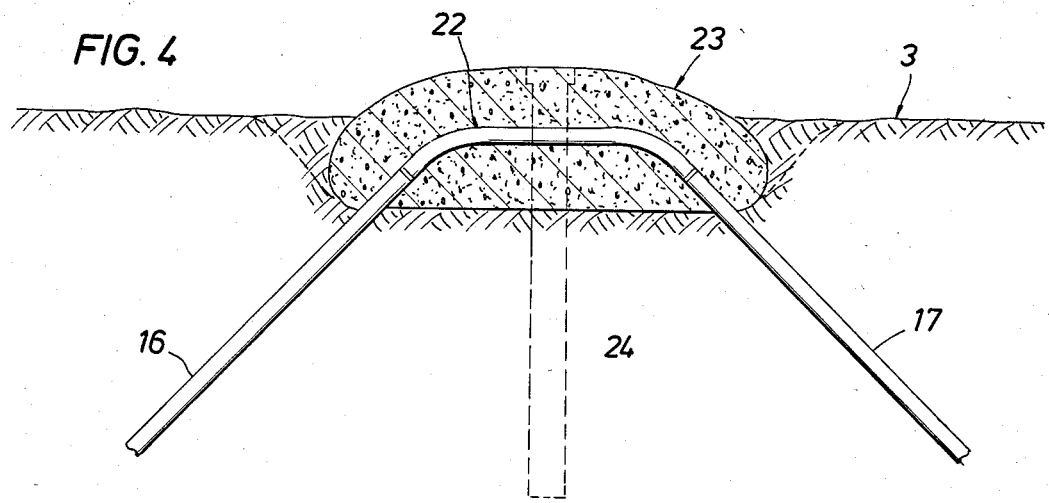

PIPELAYING IN ARTIC OFFSHORE WATERS

BACKGROUND OF THE INVENTION

Drilling by the oil industry in Arctic offshore waters, typically from artificial gravel islands constructed to support such drilling activities, creates a need for pipelines from these offshore drilling sites to transport oil and gas to production facilities onshore. Conventional pipelaying techniques are extremely difficult to implement in the Arctic offshore area due to several factors: (1) a variable shifting ice cover, which can damage floating vessels or prevent movement of such vessels during much of the year; (2) gouging of the seafloor by ice keels, which requires that pipelines be deeply buried to prevent damage; and (3) permafrost soil conditions, which can lead to pipeline failure due to loss of soil support under the pipeline. Pipeline construction from the surface of the ice during winter is treacherous and impractical, and the open water construction season in summer is both short and unpredictable.

Applicant is not aware of any prior art which, in his judgment as one skilled in the pipeline art, would anticipate or render obvious the novel pipeline construction technique of the present invention; however, for the purposes of fully developing the background of the invention and establishing the state of the requisite art, the following art is set forth and incorporated hereinto: Offshore, December, 1983, pages 17 and 22; U.S. Pat. Nos. 2,706,616; 2,847,655; 3,817,345; 4,245,313; 4,319,240; 4,117,895 and 4,221,503.

SUMMARY OF THE INVENTION

The primary purpose of the present invention is to provide a method and apparatus for pipelaying in Arctic offshore waters, which method and apparatus are economical to use, and which do not subject construction equipment and personnel to many of the dangers associated with the Arctic offshore environment. Accordingly, a method is provided for laying a pipeline in an offshore area wherein the seafloor is subject to ice gouging, and wherein the near-surface soil may include layers of unstable permafrost. The pipelaying method comprises drilling a series of invert, arcuate underground paths, each path extending from the seafloor at each end to a depth below which ice gouging is known historically to have occurred in the area; placing pipeline segments along these underground paths; and connecting adjacent ends of the pipeline segments to form a continuous pipeline. Preferably, the connected ends of the pipeline segments are protected from ice gouging by ice-resistant structures which are formed by placing and/or pouring reinforced concrete caps or similar protective means over the connecting ends of the pipeline segments. In addition, a mobile drilling-pipeline construction vessel is provided, which structure extends to a height greater than the deepest water in which pipelaying is to be conducted. Preferably, this conical shaped vessel consists of a reinforced outer wall to resist ice forces; an inner wall and partial bottom which divide the internal volume of the structure into a ballast tank and bottomless work area; means for ballasting down the vessel to a position on the seafloor; means for drilling a slanted borehole into the seafloor; and means for inserting a pipeline segment into the borehole. Also preferably, the vessel includes means for connecting a pipeline inserted into one borehole with a pipeline segment inserted into an adjacent borehole, and means for forming a protective cover above and about the ends of the connected pipeline segments.

Other purposes, distinctions over the art, advantages and features of the invention will be apparent to one skilled in the art upon review of the following.

BRIEF DESCRIPTION OF THE DRAWINGS

FIG. 1 depicts a pipeline laid in a series of deep underground arcs.

FIG. 2 shows a pipeline construction operation using a directional drilling rig mounted on a mobile drilling-pipeline construction vessel.

FIG. 3 shows a pipeline tie-in operation.

FIG. 4 discloses a finished pipeline tie-in with a pile supported, poured concrete protective cap which is resistant to ice gouging.

DESCRIPTION OF PREFERRED EMBODIMENTS

The present invention provides a method for installing offshore pipelines which minimizes or eliminates the hazards mentioned above in connection with offshore Arctic pipelaying. In accordance with the directional drilling technique of the present invention, a special inclined drilling rig drills and places the pipeline underground in a deep curved arc, surfacing as far as two to three miles away from the drilling site. In Arctic waters such a rig can install the entire pipeline to shore (including the shore crossing) as a connected series of deep underground arcs, with seabottom tie-ins at two to three mile intervals at the intersection points. A special purpose construction-pipelay vessel is required to support the directional drilling rig as it drills the various segments of the pipeline. This vessel additionally performs the seabottom pipeline tie-in operations, and installs special means for protecting the tie-in before being moved to the next drilling location.

Advantages of the directional drilling method of this invention for construction of Arctic pipelines include: (1) The pipeline is absolutely safe from ice gouging everywhere except at the few discrete tie-in locations. Special protection means, such as large concrete slabs or domes on the seafloor, are installed over the pipeline tie-ins to minimize the damage risk at these locations. (2) The pipeline is protected from loss of soil support (permafrost conditions) by virtue of the arc-shaped pipeline geometry. Subsidence causes an increase in pipe tension which, in turn, stabilizes the pipeline in a new stress-limited configuration. (3) Protection of the pipeline construction operation from the shifting surface ice conditions depends upon the design of the construction-pipelay vessel. A preferred vessel design in accordance with the present invention which is relatively resistant to ice forces is described hereinafter and shown in the drawings. (4) The directionally drilled pipeline is not subject to damage from dredging operations. (5) Permits are easier and faster to obtain because of lessened environmental impact. (6) Waterway traffic is not exposed to navigational hazards or interruptions. (7) The cost of moving vast amounts of earth is eliminated as well as restoration costs in areas where the pipeline goes ashore. (8) The pipeline is virtually maintenance free. (9) Drilling can be done without interference with shipping corridors and other existing pipelines. (10) Obstacles which may be avoided include shore crossings made difficult by heavy surf, steep bluffs, unstable soil, or heavily ice-encrusted shore areas, environmental, archaeological, or recreational restrictions, man-made obstructions, and industrial and commercial areas making above-ground right of way difficult to obtain and hazardous.

For use as a pipeline construction vessel, a conical shaped shell structure is provided with a height greater than the deepest water to be encountered, and with base diameter of about three to six times the water depth. The conical structure is truncated at the top by a large flat deck, which supports all the necessary equipment such as drilling rig, pipe rack, personnel quarters, power plant, etc. The outer conical wall of the structure is reinforced to resist ice forces. An inner conical wall and partial bottom divide the internal volume of the structure into a ballast tank (outer annulus) and a "moon pool" work area (inner annulus). Special ice breaking tugboats are required to move this vessel, in floating condition, from one drilling site to another.

Upon arriving at a drilling site, the construction-pipelay vessel is ballasted down by filling the outer annulus with water. This ballasting serves to anchor the vessel in place sufficiently to resist combined wind, wave and ice forces. Directional drilling operations then proceed to install a new two to three-mile long pipe segment (toward shore, for example). While these drilling operations are underway, the inner annulus is pumped dry so that later seafloor operations can be performed in the dry state. Upon completion of the drilling operations, the two pipe ends are cut off at the seafloor and a spool piece is welded in place between the two pipe ends. Protection in the form of either a pre-cast concrete slab or dome, or a poured-in-place concrete cap is then installed over and/or around the pipeline tie-in. A small seabottom excavation around the pipeline tie-in, as well as installation of piles on either side of the tie-in, may be required to obtain a sufficient degree of protection against the forces of ice gouging. Finally, the inner annulus of the construction-pipelay vessel is flooded and the outer annulus is deballasted to permit the towing of the vessel to the next drilling site.

Having thus generally described the apparatus and method of the present invention, as well as its numerous advantages over the art, the following is a description thereof, given in accordance with specific reference to the drawings.

As shown in FIG. 1, the pipeline is laid as a series of deep underground arcs. The pipeline may begin offshore, for example, from a gravel island 1, with the first arc 2 of the pipeline extending downward below seabottom 3 and well below the ice or water line 4, then curving upwardly to the seafloor to a means 5 for protection of the seafloor tie-in. Subsequent arcs such as 6 and subsequent tie-ins such as 7, proceed to an eventual shore crossing 8 via arc 9 which passes under the shoreline to an onshore facility 10 for further processing or transfer of the oil and/or gas. Alternatively, the pipeline construction could proceed in the opposite direction, from the onshore facilities to the offshore facilities (gravel island, say), or could proceed from two or more places simultaneously if more than one pipeline construction vessel were available.

As shown in FIG. 2, the pipeline construction operation makes use of a mobile drilling-pipeline construction vessel which is a special conical shaped vessel with reinforced outer walls to resist ice forces arising from floating ice masses 12. Mounted on top of this vessel is a special inclined directional drilling rig 13 along with crew quarters 14 and pipe rack 15. Pipe end 16 beneath vessel 11 is positioned by a previous directional drilling operation, while new pipeline section 17 is being drilled and pushed into place from the vessel.

FIG. 3 shows the pipeline tie-in operation. In this figure the pipeline construction vessel 11 is in a special mode wherein the moon pool 18 is pumped dry for the tie-in operation. Instead of the directional drilling rig 13, there is provided a crane 19 which operates through the moon pool 18 with work means 20 to perform the pipeline tie-in operation. For this operation, the outer annulus 21 of the vessel is filled with water to anchor the vessel in place.

FIG. 4, shows the finished pipeline tie-in with a pile supported, poured concrete protective cap which is resistant to ice gouging. Thus, tie-in spool piece 22 is provided which connects the directional drilled pipeline segment 16 which proceeds toward an offshore well site with the directional drilled pipeline segment 17 which proceeds, for example, toward onshore facilities. The poured concrete protective cap 23 encloses the tie-in spool piece 22. Preferably, the poured cap 23 extends slightly above the top of the tie-in spool piece 22 which is approximately level with the seafloor, and the cap 23 also extends well into the seafloor. For added strength to resist ice gouging forces, there preferably is provided a pile or piles 24, preferably one on each side of the pipeline, drilled or driven in place to stabilize the protective cap.

The foregoing description of the invention is merely intended to be explanatory thereof, and various changes in the details of the described method and apparatus may be made within the scope of the appended claims without departing from the spirit of the invention.

What is claimed is:

1. A method for laying a pipeline in an offshore area wherein the seafloor is subject to ice gouging, comprising determining the depth to which ice gouging is known to historically have occurred in the offshore area, drilling a series of invert arcuate underground paths, each path extending to below the depth to which ice gouging is known historically to have occurred in the offshore area; placing pipeline segments along these underground paths; connecting adjacent ends of the pipeline segments at a location subject to ice gouging; and protecting the connected ends of the pipeline segments from ice gouging by an ice-resistant structure.

2. The method of claim 1 wherein the ice-resistant structure is a large slab of concrete.

3. The method of claim 1 wherein the ice-resistant structure is formed by encapsulating the connected ends of the pipeline segment with a large slab of concrete and supporting the concrete with at least one pile extending into the seafloor.

4. The method of claim 1 wherein the pipeline segments are pushed into the underground paths simultaneously with drilling the paths.

5. The method of claim 1 wherein a drilling-pipeline construction vessel having a truncated conical shape with ice-resistant outer walls is positioned over a drilling location and sunk into position by filling an outer annulus with water.

6. A drilling-pipeline construction vessel comprising a shell structure with a height greater than the deepest water in which pipelaying is to be conducted; said shell structure including a reinforced ice-resistant outer wall and an inner wall and partial bottom which divide the internal volume of the structure into a ballast tank and bottomless work area; means for ballasting down the vessel to a position on the seafloor; means for removing water from the bottomless work area; means for drilling a slanted borehole into the seafloor; means for inserting a pipeline segment into the borehole; means for connecting a pipeline segment inserted into one borehole with a pipeline segment inserted into an adjacent borehole; means for excavating sea bottom from around the adjacent boreholes; and means for pouring concrete into the excavated seabottom to form a protective cover over and about the connected ends of the pipeline segments.

7. The vessel of claim 6 wherein the shell structure is conical and truncated at the top by a flat deck, the ballast tank forms an outer annulus and the work area forms an inner annulus.

8. A drilling-pipeline construction vessel comprising a shell structure with a height greater than the deepest water in which pipelaying is to be conducted; said shell structure including a reinforced ice-resistant outer wall and an inner wall and partial bottom which divide the internal volume of the structure into a ballast tank and bottomless work area; means for ballasting down the vessel to a position on the seafloor; means for removing water from the bottomless work area; means for drilling a slanted borehole into the seafloor; means for inserting a pipeline segment into the borehole; means for connecting a pipeline segment inserted into one borehole with a pipeline segment inserted into an adjacent borehole; means for excavating sea bottom from around the adjacent boreholes; and means to form a protective cover over and about the connected ends of the pipeline segments.

* * * * *